Figure 1:
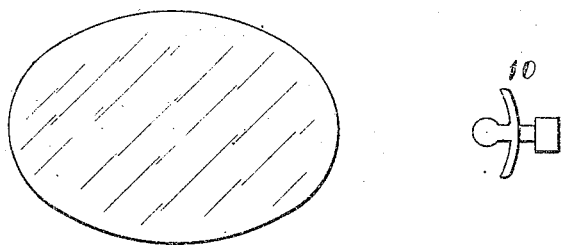

A. J. CROSS.
STRUCTURE OF METAL AND GLASS OR THE LIKE.
APPLICATION FILED SEPT. 1, 1915.

1,167,798. Patented Jan. 11, 1916.

Andrew J. Cross, Inventor
By his Attorney,
W. B. Hutchinson.

UNITED STATES PATENT OFFICE.

ANDREW JAY CROSS, OF NEW YORK, N. Y.

STRUCTURE OF METAL AND GLASS OR THE LIKE.

1,167,798.  Specification of Letters Patent.  Patented Jan. 11, 1916.

Application filed September 1, 1915. Serial No. 48,380.

*To all whom it may concern:*

Be it known that I, ANDREW JAY CROSS, a citizen of the United States, and a resident of the city, county, and State of New York, have invented a new and useful Improvement in Structures of Metal and Glass or the like, of which the following is a full, clear, and exact description.

My invention relates to improved structures of metal and glass or glass-like material, and the invention is especially applicable to structures like eyeglasses, in which it is necessary to have the lenses or glasses secured firmly in their frames or mountings, but in such a way that they can be readily demounted.

The most common way of fastening eyeglasses to their frames or stud straps, is by the use of screws, and this while generally reliable, is an unsatisfactory means of fastening because many lenses are broken either in drilling the holes for the screws, or by fastening the screws so tight as to crack the glass. Moreover the screws often become loose. To obviate these difficulties, stud-straps, end-pieces, frames, etc., have been provided with special shapes, and united to the glass by shellac or other crystallizable cements, but this method is objectionable because a sudden blow is likely to crack the cement and so loosen the lens in its support. On the other hand if noncrystallizable cements are used, or cements which absorb moisture, or are soluble in water, or other hydrous fluids, the cement is likely to become loose under moist conditions or damp atmosphere. In all such structures it is necessary to have the glass readily demountable because often it is desirable to place a valuable lens in another frame or mounting.

The object of my invention is to overcome the above defects, and produce a simple structure of metal and glass or glass-like material, and especially eyeglasses in which the glass is securely held to the metal without the use of screws or the like, in which the united parts are held securely, and which also permits the glass to be disunited from the metal when necessary.

Reference is to be had to the accompanying drawings forming a part of this specification, in which similar reference characters indicate corresponding parts in all the views.

Figure 2:
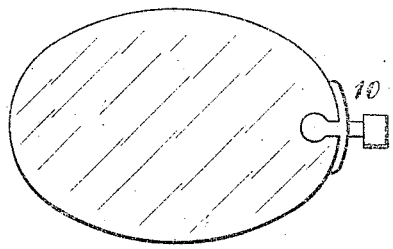

Figure 1 is a view showing an eye-glass separated from its mounting or support, and Fig. 2 is a view of an eye-glass and mounting attached.

Obviously the form of mounting or support for the glass is not material, and I have illustrated my invention as applied to eye-glasses or spectacles, because this is a very common and important use of it.

In carrying my invention into effect, I employ as the cementitious substance some cement or semi-cement or mastic, whose crystallizable qualities can be controlled by oven drying, and which is soluble in water or other hydrous fluids, or at least sufficiently pervious to water to become soft when soaked. In using it I apply a little of the cement to the glass at the point which enters the mounting 10, and also apply a little of the cement to the surface of the mounting which comes in contact with the glass. I then unite them, and with a sponge or the like remove the excess cement from the part adjacent to the mounting, so as to leave the glass clear, after which the glass and mounting are adequately oven dried, thereby evaporating the water from the cement and making a firm union between the two parts. When thus fastened the parts would permanently remain in position if they were always kept in dry air, but obviously this is not possible, therefore I seal the exposed edges of the united parts by an elastic varnish or covering which is applied at the junction of the glass and metal, and which varnish or covering should be of a kind which is not soluble in water or other hydrous fluids, but is soluble in benzin, alcohol, or some other liquid.

After the varnish is applied I remove the superfluous varnish, which may be spread out over the glass, by mechanically scraping it off or by means of a sponge, cloth, or brush wet with benzin or other material which will cut or dissolve the excess varnish. It will be seen then that when the parts are united as above described, the cement or mastic-like composition holds the parts firmly together, because it cannot be attacked by moisture from the atmosphere, and the seal being unattacked by water, serves to permanently protect the cement. The varnish serves the double function of preventing moisture from entering and softening the cement, and it also prevents the moisture from evaporating from the cement so that the latter may become crystallized and too dry. If, however, it is desirable to demount the lens or glass, the seal is removed by mechanically scraping or by the application of benzin, alcohol or some substance which will break the seal and dissolve it, and then the lens and its mounting can be placed in hot water until the cement is softened, after which the glass can be freely removed. Still another way would be to soak both seal and cement in a boiling solution of alcohol or other fluid, and water, which would serve to dissolve and soften both varnish and cement at one operation.

While I have shown my invention as applied to eyeglasses and spectacles, it will be readily seen that the structure is easily adapted to combinations of glass, porcelain, or the like, with any metal capable of the treatment herein described.

I claim:—

1. A structure composed of metal and glass or the like, in which the parts are united by a cement capable of being softened by water or other hydrous fluid, and a seal for the joint, said seal being impervious to air and moisture.

2. A structure of metal and glass or the like, in which the glass and metal are united by a cement capable of being softened by water, and a varnish seal for the meeting parts, said seal being impervious to air and moisture.

3. The combination of eyeglasses and their mountings, the glasses and mountings being cemented together by a cement which can be softened in water, and the united parts being hermetically sealed by a seal which is impervious to air and moisture.

4. The construction of eyeglasses in which the metal and glass parts are united by a cement which can be softened in water, and a varnish seal for the united parts, said seal being impervious to air and moisture.

ANDREW JAY CROSS.

Witnesses:
  WARREN B. HUTCHINSON,
  ARTHUR G. DANNELL.